(12) United States Patent
Han et al.

(10) Patent No.: US 12,334,622 B2
(45) Date of Patent: Jun. 17, 2025

(54) HEXAGONAL FRUSTUM DEPLOYABLE UNIT AND DEPLOYABLE MECHANISM FORMED BY THE SAME

(71) Applicant: Yanshan University, Qinhuangdao (CN)

(72) Inventors: Bo Han, Qinhuangdao (CN); Zhantu Yuan, Qinhuangdao (CN); Yuan Jiang, Qinhuangdao (CN); Yundou Xu, Qinhuangdao (CN); Jiantao Yao, Qinhuangdao (CN); Yongsheng Zhao, Qinhuangdao (CN)

(73) Assignee: Yanshan University, Qinhuangdao (CN)

( * ) Notice: Subject to any disclaimer, the term of this patent is extended or adjusted under 35 U.S.C. 154(b) by 202 days.

(21) Appl. No.: 18/303,649

(22) Filed: Apr. 20, 2023

(65) Prior Publication Data
US 2023/0344110 A1  Oct. 26, 2023

(30) Foreign Application Priority Data
Apr. 21, 2022  (CN) .......................... 202210426885.6

(51) Int. Cl.
| | | |
|---|---|---|
| F16M 11/24 | (2006.01) | |
| B64G 1/22 | (2006.01) | |
| H01Q 1/08 | (2006.01) | |
| H01Q 1/12 | (2006.01) | |
| H01Q 1/28 | (2006.01) | |

(52) U.S. Cl.
CPC ......... *H01Q 1/1235* (2013.01); *F16M 11/245* (2013.01); *H01Q 1/08* (2013.01); *B64G 1/222* (2013.01); *H01Q 1/288* (2013.01)

(58) Field of Classification Search
CPC ........ H01Q 1/1235; H01Q 1/288; H01Q 1/08; H01Q 1/1257; H01Q 3/06; F16M 11/245; B64G 1/222
See application file for complete search history.

(56) References Cited

U.S. PATENT DOCUMENTS

2020/0203799 A1* 6/2020 Xu ....................... H01Q 15/161

FOREIGN PATENT DOCUMENTS

| CN | 109659659 A | * | 4/2019 | ............... H01Q 1/08 |
| JP | H06104478 B2 | * | 12/1994 | |

* cited by examiner

*Primary Examiner* — Dameon E Levi
*Assistant Examiner* — Yonchan J Kim
(74) *Attorney, Agent, or Firm* — IPRO, PLLC

(57) ABSTRACT

The present invention provides a hexagonal frustum deployable unit and the deployable mechanism formed by the same, which includes hexagonal frustum deployable units, unit connecting rods and support frames, $3N^2+3N+1$ hexagonal frustum deployable units are combined into a closely connected deployable mechanism through unit connecting rods and support frames; the present invention combines hexagonal frustum deployable units array into deployable mechanisms of any aperture size, which has advantages such as high rigidity, high retraction rate, high support performance and adjustable aperture size, which makes space deployable antenna mechanism safer, more efficient and convenient during operation process and solves problems of weak signal transmission or reception, small data capacity and low communication rate of traditional antennas.

3 Claims, 4 Drawing Sheets though the unit connecting rods and the support frames, one of the top discs of one of the hexagonal frustum deployable units is connected to a first end of the unit connecting rods, and a second end of the one of the unit connecting rods is connected to one of the support frames; the hexagonal frustum deployable units comprise bottom discs, first connecting rods, second connecting rods, top discs, third connecting rods, fourth connecting rods, a central disc, fifth connecting rods, sixth connecting rods, seventh connecting rods and eighth connecting rods. In each of the hexagonal frustum deployable units, the bottom discs are connected in sequence through rotation pairs between the first connecting rods and the second connecting rods, the bottom discs are arranged in a regular hexagonal shape and are located on the same plane, one of the bottom discs is connected to one of the top discs through one of the sixth connecting rods, the top discs are connected in sequence through rotation pairs between the third connecting rods and the fourth connecting rods, the top discs form a hexagonal structure; annular grooves on the central disc are respectively connected to the top discs through the fifth connecting rods, groove openings on the central disc are respectively connected to the bottom discs through the seventh connecting rods and the eighth connecting rods to form a hexagonal frustum space deployable mechanism.

HEXAGONAL FRUSTUM DEPLOYABLE UNIT AND DEPLOYABLE MECHANISM FORMED BY THE SAME

TECHNICAL FIELD

The present invention relates to the technical field of deployable antenna mechanisms, in particular to a hexagonal frustum deployable unit and a deployable mechanism formed by the same.

BACKGROUND TECHNOLOGY

With the development and popularization of technology, large-scale satellite antennas are widely used in deep space exploration, mobile communication, national defense, meteorological monitoring and other fields. Space deployable antennas are antennas with deployable functions that work in space environments. Due to the limitation of the effective launch volume of rockets, the antenna needs to be retracted during launch and then deployed and put into operation after entering orbit. Therefore, the demand for large aperture, high profile accuracy, high rigidity and high strength of space deployable antennas is increasing.

During launch, space antennas must be retracted in a deployable state within the fairing of the launch vehicle and smoothly deployed after reaching the designated position. This requires the antenna mechanism to have a large deployable ratio, that is, a small envelope volume when retracted and a large envelope volume when deployed. Space deployable antennas can be divided into truss deployable antennas, elastic deformation deployable antennas, solid surface deployable antennas and inflatable deployable antennas according to their retraction and deployment methods. The truss deployable antenna mechanism is the most widely used type of deployment mechanism. During deployment, it is a mechanism and forms a truss structure after full deployment. It has the characteristics of high structural rigidity and high spatial positioning accuracy. At the same time, this type of antenna has several identical or similar deployable mechanism units with a large overall deployable ratio, making it an ideal form for large-aperture satellite antennas.

At present, there are relatively few truss deployable antenna mechanisms. In order to meet the growing demand for aviation deployable antennas, it is very necessary to propose a hexagonal frustum deployable unit and a deployable mechanism formed by the same.

SUMMARY OF THE INVENTION

In view of the problems existing in the prior art, the present invention provides a deployable mechanism formed by several hexagonal frustum deployable units. $3N^2+3N+1$ hexagonal frustum deployable units are combined in an array to form a deployable antenna mechanism of any aperture size with strong expandability. N is an integer and is equal to or greater than 1. By controlling the rotation pair between the connecting rods and the length of the connecting rods, the hexagonal frustum deployable unit can achieve deployment and retraction with high rigidity, high retraction rate, high support performance and adjustable aperture size. This makes the space deployable antenna mechanism safer, efficient and convenient during operation, solving the problems of weak signal transmission or reception, small data capacity and low communication rate of traditional antennas.

The present invention provides a deployable mechanism, comprising hexagonal frustum deployable units, unit connecting rods and support frames, wherein the hexagonal frustum deployable units are connected in sequence through the unit connecting rods and the support frames, one of the top discs of one of the hexagonal frustum deployable units is connected to a first end of the unit connecting rods, and a second end of the one of the unit connecting rods is connected to one of the support frames; the hexagonal frustum deployable units comprise bottom discs, first connecting rods, second connecting rods, top discs, third connecting rods, fourth connecting rods, a central disc, fifth connecting rods, sixth connecting rods, seventh connecting rods and eighth connecting rods. In each of the hexagonal frustum deployable units, the bottom discs are connected in sequence through rotation pairs between the first connecting rods and the second connecting rods, the bottom discs are arranged in a regular hexagonal shape and are located on the same plane, one of the bottom discs is connected to one of the top discs through one of the sixth connecting rods, the top discs are connected in sequence through rotation pairs between the third connecting rods and the fourth connecting rods, the top discs form a hexagonal structure; annular grooves on the central disc are respectively connected to the top discs through the fifth connecting rods, groove openings on the central disc are respectively connected to the bottom discs through the seventh connecting rods and the eighth connecting rods to form a hexagonal frustum space deployable mechanism.

Preferably, each of the bottom discs comprises a first hinge joint, a second hinge joint, a third hinge joint and a fourth hinge joint; a first end of one of the first connecting rods is connected to the one of the bottom discs through the first hinge joint of the one of the bottom disc, a second end of the one of the first connecting rods is connected to a first end of the one of the second connecting rods, a second end of the second connecting rod is connected to adjacent one of the bottom discs through the second hinge joint of the adjacent one of the bottom discs; a first end of the one of the sixth connecting rods is connected to the one of the bottom discs through the fourth hinge joint of the one of the bottom discs.

Preferably, each of the top discs has a hexagonal groove structure including grooves and shaft holes are provided in the grooves, an included angle between symmetrical faces of adjacent grooves is 60°, each of the top discs comprises a fifth hinge joint, a sixth hinge joint, a seventh hinge joint, an eighth hinge joint and a ninth hinge joint, a second end of the one of the sixth connecting rods is connected to the one of the top discs through the fifth hinge joint of the one of the third connecting rods, a first end of the one of the third connecting rods is connected to the one of the top discs through the sixth hinge joint of the one of the third connecting rods, a second end of the one of the third connecting rods is connected to a first end of the one of the fourth connecting rods, a second end of the one of the fourth connecting rods is connected to adjacent one of the top discs through the eighth hinge joint of the adjacent one of the top discs.

Preferably, the central disc comprises a tenth hinge joint and an eleventh hinge joint, a first end of the one of the fifth connecting rods is connected to the one of the top discs through the seventh hinge joint of the one of the top discs; a second end of the one of the fifth connecting rods is connected to the central disc through the tenth hinge joint, a first end of the one of the seventh connecting rods is connected to the one of the bottom discs through the fourth hinge joint of the one of the bottom discs, a second end of the one of the seventh connecting rods is connected to a first end of the one of the eighth connecting rods, a second end of the one of the eighth connecting rods is connected to the central disc through the eleventh hinge joint.

Preferably, each of the bottom discs and the central disc have an identical structure and both have twelve radial groove openings with the included angle between symmetrical faces of adjacent grooves being 60° and shaft holes are provided on the twelve radial groove openings.

Preferably, the length of each of the fifth connecting rods and the sixth connecting rods is more than twice a sum of lengths of one of the first connecting rods, one of the second connecting rods and one of the third connecting rods, and one of the fourth connecting rods; by adjusting lengths of the one of the first connecting rods and the second connecting rods to change size of aperture after full deployment of a deployable antenna mechanism; by adjusting lengths of the one of the fifth connecting rods and the sixth connecting rods to change size of envelope volume occupied after full retraction of the deployable antenna mechanism.

Preferably, by adjusting the included angles between the first connecting rod, the second connecting rod, the third connecting rod and the fourth connecting rod to achieve deployment and retraction of the hexagonal frustum deployable unit; when the hexagonal frustum deployable unit is in aa half-retracted state, the fifth connecting rod and the sixth connecting rod approach each other closely and the height of the hexagonal frustum deployable unit increases; when the hexagonal frustum deployable unit is in a fully retracted state, the planes where the bottom disc, the top disc and the central disc are located remain horizontal and all the connecting rods approach each other closely and are in a minimum volume state.

Compared with the prior art, the present invention has the following advantages:

1. The present invention is composed of $3N^2+3N+1$ hexagonal frustum deployable units assembled through unit connecting rods and support frame arrays. Through vertical and horizontal array combinations, it forms a deployable antenna mechanism of any aperture size with strong expandability. In the fully retracted state, the hexagonal frustum deployable unit has closely adjacent discs and the planes of each disc remain horizontal, with high rigidity, high retraction rate, high support performance and adjustable aperture size.

2. The present invention uses rotation pairs at all mechanism connection points. The hexagonal frustum deployable unit can achieve deployment and retraction by controlling the rotation pair between the connecting rods and the length of the connecting rods. Not only can it change the size of the aperture after full deployment of the deployable antenna mechanism, but also the size of the envelope volume occupied after full retraction of the deployable antenna mechanism, is better applied to the field of aerospace satellite communication.

3. The structure of the present invention has a high degree of symmetry. The hexagonal frustum deployable units are fixedly connected by unit connecting rods and support frames in a cross manner, which improves the rigidity after deployment of the entire deployable antenna mechanism and also helps to improve the adaptability of the deployable antenna mechanism to the growing demand in space research. This makes the space deployable antenna mechanism safer, efficient and convenient during operation, solving the problems of weak signal transmission or reception, small data capacity and low communication rate of traditional antennas.

Figure 1:
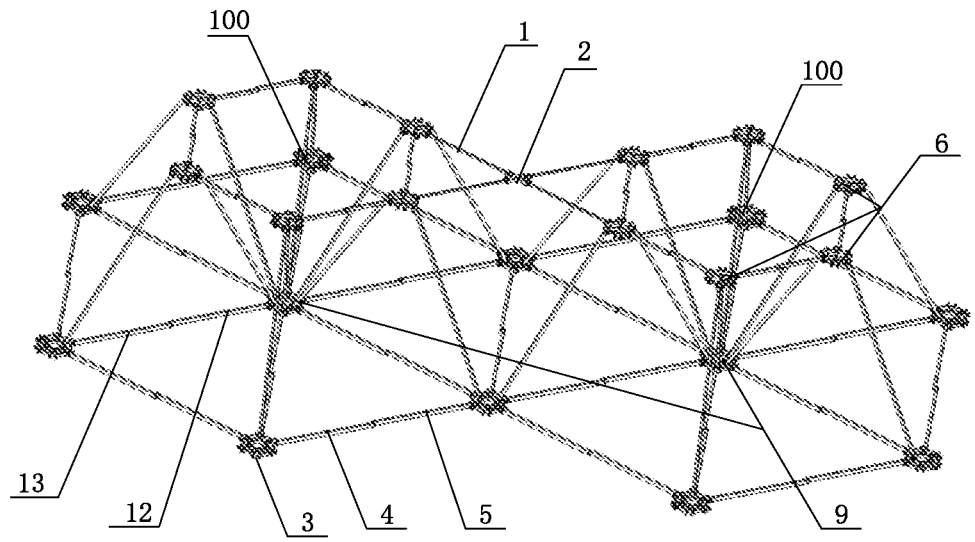
FIG. 1 is a schematic view of the overall structure of the mating connection between the hexagonal frustum deployable units of the present invention.

MAIN REFERENCE NUMERALS IN THE DRAWINGS hexagonal frustum deployable unit 100, unit connecting rod 1, support frame 2, bottom disc 3, first hinge joint 31, second hinge joint 32, third hinge joint 33, fourth hinge joint 34, first connecting rod 4, second connecting rod 5, top disc 6, fifth hinge joint 61, sixth hinge joint 62, seventh hinge joint 63, eighth hinge joint 64, ninth hinge joint 65, third connecting rod 7, fourth connecting rod 8, central disc 9, tenth hinge joint 91, eleventh hinge joint 92, fifth connecting rod 10, sixth connecting rod 11, seventh connecting rod 12 and eighth connecting rod 13.

DETAILED DESCRIPTION OF THE PREFERRED EMBODIMENTS

The technical contents, structural features, attained objects and effects of the present invention will be described in detail below with reference to the accompanying drawings.

Figure 2:
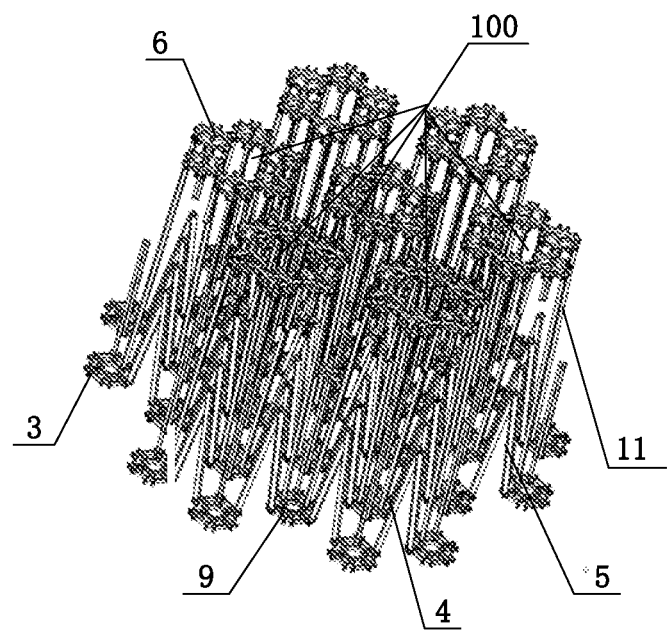
FIG. 2 is a schematic view of the overall structure of the hexagonal frustum deployable unit and the deployable mechanism formed by the same of the present invention.

The hexagonal frustum deployable unit and the deployable mechanism formed by the same provided by the present invention, as shown in FIGS. 1 and 2, comprise $3N^2+3N+1$ hexagonal frustum deployable units 100, unit connecting rods 1 and support frames 2, the hexagonal frustum deployable units 100 are connected in sequence through the unit connecting rods 1 and the support frames 2, a top disc 6 of the hexagonal frustum deployable unit 100 is connected to a first end of the unit connecting rod 1, and a second end of the unit connecting rod 1 is connected to the support frame 2. The support frame 2 mainly serves to interconnect and fix the hexagonal frustum deployable units 100.

As shown in FIGS. 3-6, the hexagonal frustum deployable unit 100 comprises a bottom disc 3, a first connecting rod 4, a second connecting rod 5, a top disc 6, a third connecting rod 7, a fourth connecting rod 8, a central disc 9, a fifth connecting rod 10, a sixth connecting rod 11, a seventh connecting rod 12 and an eighth connecting rod 13. The bottom discs 3 are connected in sequence through rotation pairs between the first connecting rods 4 and the second connecting rods 5, a plurality of the bottom discs 3 are arranged in a regular hexagonal shape and are located on the same plane, the bottom disc 3 is connected to the top disc 6 through the sixth connecting rod 11, the top discs 6 are connected in sequence through rotation pairs between the third connecting rods 7 and the fourth connecting rods 8, a plurality of the top discs 6 form a hexagonal structure. The annular grooves on the central disc 9 are connected to the top disc 6 through the fifth connecting rod 10. The groove openings on the central disc 9 are connected to the bottom disc 3 through the seventh connecting rod 12 and the eighth connecting rod 13 to form a hexagonal frustum space deployable mechanism.

Figure 3:
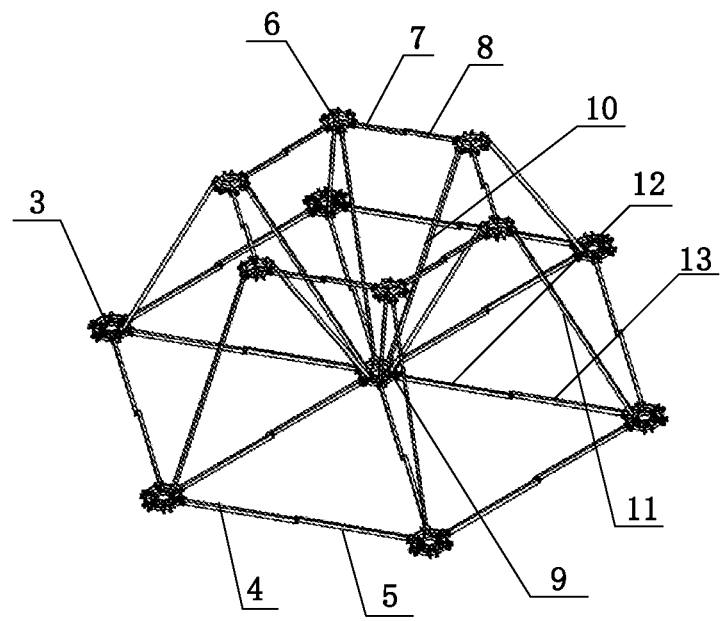
FIG. 3 is a schematic view of the overall structure of the fully deployed hexagonal frustum deployable unit of the present invention.
Figure 4:
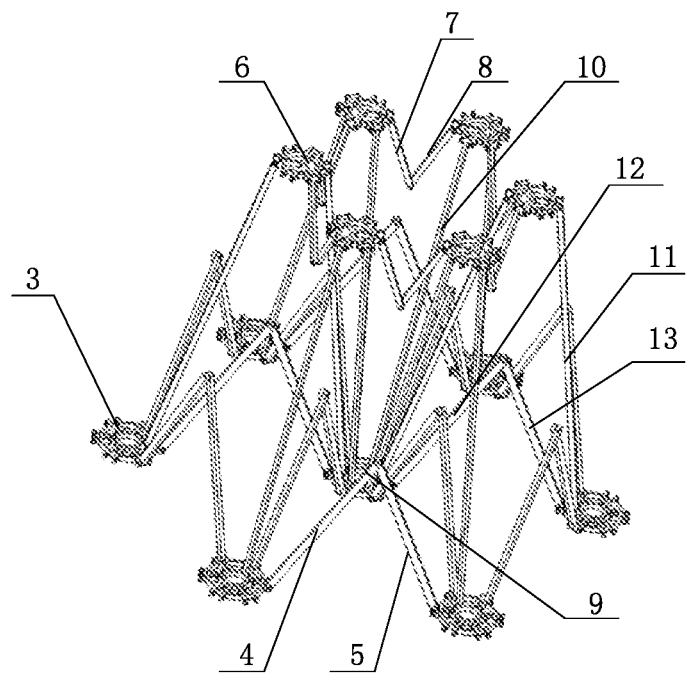
FIG. 4 is a schematic view of the overall structure of the half-retracted hexagonal frustum deployable unit of the present invention.
Figure 5:
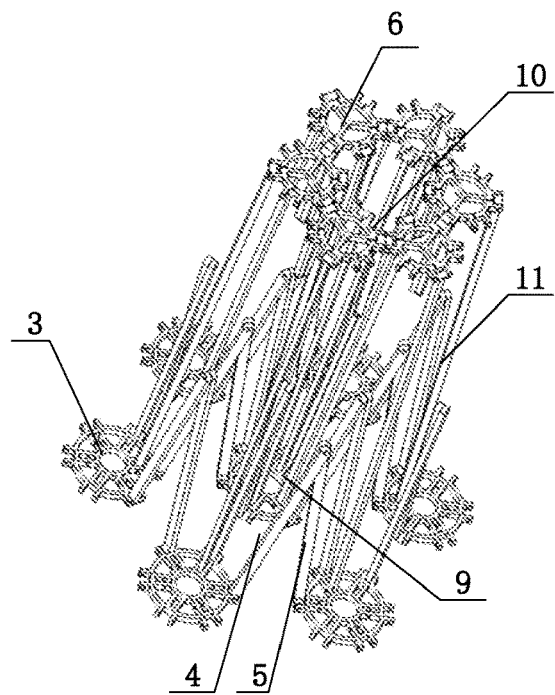
FIG. 5 is a schematic view of the overall structure of the fully retracted hexagonal frustum deployable unit of the present invention.
Figure 6:
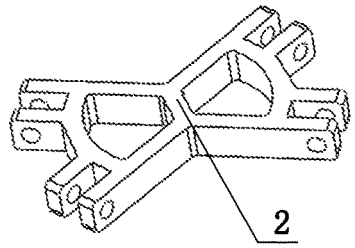
FIG. 6 is a schematic view of the support frame structure of the hexagonal frustum deployable unit and the deployable mechanism formed by the same of the present invention.

In combination with FIG. 3, the lengths of the fifth connecting rod 10 and the sixth connecting rod 11 are more than twice the sum of the lengths of the first connecting rod 4, the second connecting rod 5 and the third connecting rod, the fourth connecting rods 8; by adjusting the lengths of the first connecting rod 4 and the second connecting rod 5 to change the size of aperture after full deployment of a deployable antenna mechanism; by adjusting the lengths of the fifth connecting rod 10 and the sixth connecting rod 11 to change the size of envelope volume occupied after full retraction of the deployable antenna mechanism.

Figure 7:
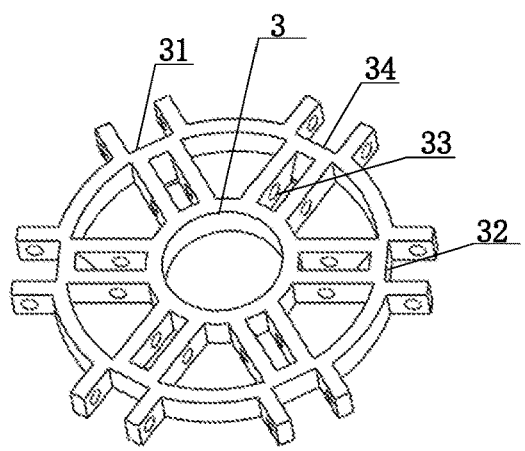
FIG. 7 is a schematic view of the bottom disc structure of the hexagonal frustum deployable unit and the deployable mechanism formed by the same of the present invention.

As shown in FIG. 7, the bottom disc 3 comprises a first hinge joint 31, a second hinge joint 32, a third hinge joint 33 and a fourth hinge joint 34, a first end of the first connecting rod 4 is connected to the bottom disc 3 through the first hinge joint 31, a second end of the first connecting rod 4 is connected to a first end of the second connecting rod 5, a second end of the second connecting rod 5 is connected to an adjacent bottom disc 3 through the second hinge joint 32, a first end of the sixth connecting rod 11 is connected to the bottom disc 3 through the fourth hinge joint 34. By adjusting included angles between the first connecting rod 4, the second connecting rod 5, the third connecting rod 7 and the fourth connecting rod 8 to achieve deployment and retraction of the hexagonal frustum deployable unit 100; when the hexagonal frustum deployable unit 100 is in a half-retracted state, the fifth connecting rod 10 and the sixth connecting rod 11 approach each other closely and the height of the hexagonal frustum deployable unit 100 increases; when the hexagonal frustum deployable unit 100 is in a fully retracted state, the planes where the bottom disc 3, the top disc 6 and the central disc 9 are located remain horizontal and all connecting rods approach each other closely and are in a minimum volume state.

Figure 8:
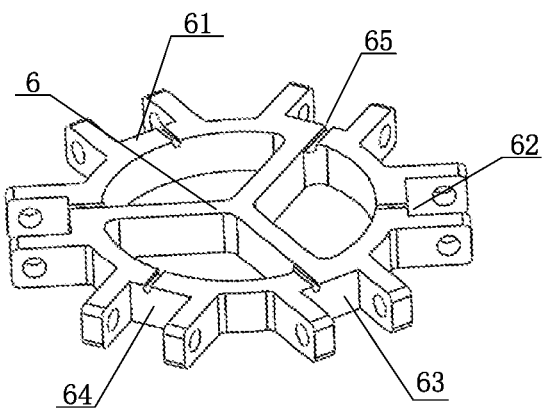
FIG. 8 is a schematic view of the top disc structure of the hexagonal frustum deployable unit and the deployable mechanism formed by the same of the present invention.

As shown in FIG. 8, the top disc 6 has a hexagonal groove structure and shaft holes are provided in the grooves, the included angle between symmetrical faces of adjacent grooves is 60°, the top disc 6 comprises a fifth hinge joint 61, a sixth hinge joint 62, a seventh hinge joint 63, an eighth hinge joint 64 and a ninth hinge joint 65, a second end of the sixth connecting rod 11 is connected to the top disc 6 through the fifth hinge joint 61, a first end of the third connecting rod 7 is connected to the top disc 6 through the sixth hinge joint 62, a second end of the third connecting rod 7 is connected to a first end of the fourth connecting rod 8, a second end of the fourth connecting rod 8 is connected to an adjacent top disc 6 through the eighth hinge joint 64.

Figure 9:
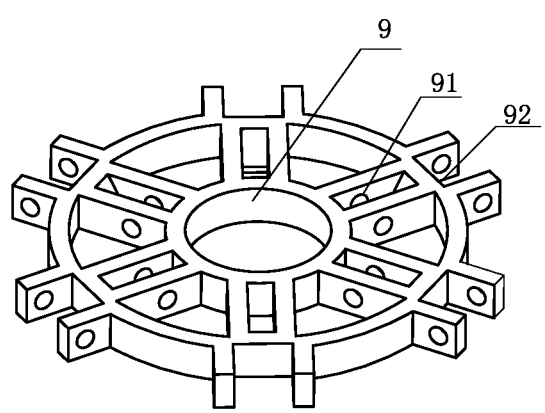
FIG. 9 is a schematic view of the central disc structure of the hexagonal frustum deployable unit and the deployable mechanism formed by the same of the present invention.

As shown in FIG. 9, the central disc 9 comprises a tenth hinge joint 91 and an eleventh hinge joint 92, a first end of the fifth connecting rod 10 is connected to the top disc 6 through the seventh hinge joint 63, a second end of the fifth connecting rod 10 is connected to the central disc 9 through the tenth hinge joint 91, a first end of the seventh connecting rod 12 is connected to the bottom disc 3 through the fourth hinge joint 34, a second end of the seventh connecting rod 12 is connected to a first end of the eighth connecting rod 13, a second end of the eighth connecting rod 13 is connected to the central disc 9 through the eleventh hinge joint 92. The bottom disc 3 and the central disc 9 have the same structure and both have twelve radial groove openings with the included angle between symmetrical faces of adjacent grooves being 60° and shaft holes are provided on the groove openings.

The hexagonal frustum deployable unit and the deployable mechanism formed by the same according to the present invention will be further described with reference to the following embodiment:

Embodiment

In this embodiment, according to the changes in the satellite deployable antenna tasks, by adaptively increasing or decreasing the number of the hexagonal frustum deployable units 100 on basis of the deployable antenna mechanism, more extensive use effect can be achieved to meet actual satellite task requirements. The hexagonal frustum deployable unit 100 is key structure for the deployable antenna mechanism to achieve deployment. The hexagonal frustum deployable units 100 are interconnected and the deployable mechanism has the functions of deployment and retraction.

The operation process of the embodiment is realized as follows:

The hexagonal frustum deployable unit and the deployable mechanism formed by the same provided by the present invention are assembled from $3N^2+3N+1$ hexagonal frustum deployable units 100, unit connecting rods 1 and support frames 2. The deployable antenna mechanism is accommodated in the effective payload cabin of rocket during rocket launch, and the hexagonal frustum deployable units 100 are in a fully retracted state. At this moment, the total volume of the deployable antenna mechanism is minimum.

The deployment process in aerospace space of the hexagonal frustum deployable unit and the deployable mechanism formed by the same provided by the present invention can be divided into two stages:

First stage: after the satellite enters orbit, the deployable antenna mechanism executes an unlock according to the task instruction. The hexagonal frustum deployable unit 100 begins to deploy. The fifth connecting rod 10 and the sixth connecting rod 11 simultaneously drive the bottom disc 3 and the top disc 6 to expand radially along the central disc 9, respectively. This then drives the first connecting rod 4 and the second connecting rod 5 connected between the bottom discs 3 to extend outward. The third connecting rod 7 and the fourth connecting rod 8 connected between the top discs 6 and the seventh connecting rod 12 and the eighth connecting rod 13 connected between the bottom disc 3 and the central disc 9 extend outward.

Second stage: after the hexagonal frustum deployable unit 100 is fully deployed, the first connecting rod 4 and the second connecting rod 5, the third connecting rod 7 and the fourth connecting rod 8, the seventh connecting rod 12 and the eighth connecting rod 13 respectively extend into a straight line. After the mechanism reaches the limit position and locks, the deployable antenna mechanism is transformed into a stable structure.

The embodiments described above are only a description of the preferred embodiment of the present invention and are not intended to limit the scope of the present invention. Without departing from the spirit of the design of the present invention, various variations and improvements made to the technical solutions of the present invention by persons of ordinary skill in the art shall fall within the scope of protection determined by the claims of the present invention.

What is claimed is:

1. A deployable mechanism, comprising hexagonal frustum deployable units, unit connecting rods and support frames; wherein a quantity of the hexagonal frustum deployable units is $3N^2+3N+1$, and N is an integer and is equal to or greater than 1; wherein each of the hexagonal frustum deployable units comprises bottom discs, first connecting rods, second connecting rods, top discs, third connecting rods, fourth connecting rods, a central disc, fifth connecting rods, sixth connecting rods, seventh connecting rods and eighth connecting rods; the hexagonal frustum deployable units are connected in sequence through the unit connecting rods and the support frames, one of the top discs of one of the hexagonal frustum deployable units is connected to a first end of one of the unit connecting rods, and a second end of the one of the unit connecting rods is connected to one of the support frames, and the one of the support frames is further connected to one of the top discs of another one of the hexagonal frustum deployable units through another one of the unit connecting rods; in each of the hexagonal frustum deployable units, the bottom discs are connected in sequence through rotation pairs between the first connecting rods and the second connecting rods, the bottom discs are arranged in a regular hexagonal shape and are located on a same plane, one of the bottom discs is connected to one of the top discs through one of the sixth connecting rods, the top discs are connected in sequence through rotation pairs between the third connecting rods and the fourth connecting rods, the top discs form a hexagonal structure; annular grooves on the central disc are respectively connected to the top discs through the fifth connecting rods; groove openings on the central disc are respectively connected to the bottom discs through the seventh connecting rods and the eighth connecting rods to form a hexagonal frustum space deployable mechanism; each of the bottom discs comprises a first hinge joint, a second hinge joint, a third hinge joint and a fourth hinge joint; a first end of one of the first connecting rods is connected to the one of the bottom discs through the first hinge joint of the one of the bottom disc, a second end of the one of the first connecting rods is connected to a first end of one of the second connecting rods, a second end of the one of the second connecting rods is connected to adjacent one of the bottom discs through the second hinge joint of the adjacent one of the bottom discs; a first end of the one of the sixth connecting rods is connected to the one of the bottom discs through the fourth hinge joint of the one of the bottom discs; each of the top discs has a hexagonal groove structure including grooves and shaft holes are provided in the grooves, an included angle between symmetrical faces of adjacent grooves is 60°; each of the top discs comprises a fifth hinge joint, a sixth hinge joint, a seventh hinge joint, an eighth hinge joint and a ninth hinge joint; a second end of the one of the sixth connecting rods is connected to the one of the top discs through the fifth hinge joint of the one of the top discs; a first end of one of the third connecting rods is connected to the one of the top discs through the sixth hinge joint of the one of the top discs, a second end of the one of the third connecting rods is connected to a first end of one of the fourth connecting rods, a second end of the one of the fourth connecting rods is connected to adjacent one of the top discs through the eighth hinge joint of the adjacent one of the top discs; the central disc comprises a tenth hinge joint and an eleventh hinge joint, a first end of one of the fifth connecting rods is connected to the one of the top discs through the seventh hinge joint of the one of the top discs; a second end of the one of the fifth connecting rods is connected to the central disc through the tenth hinge joint; a first end of one of the seventh connecting rods is connected to the one of the bottom discs through the fourth hinge joint of the one of the bottom discs, a second end of the one of the seventh connecting rods is connected to a first end of one of the eighth connecting rods, a second end of the one of the eighth connecting rods is connected to the central disc through the eleventh hinge joint.

2. The deployable mechanism according to claim 1, wherein each of the bottom discs and the central disc have an identical structure and both have twelve radial groove openings with the included angle between symmetrical faces of adjacent grooves being 60° and shaft holes are provided on the twelve radial groove openings.

3. The deployable mechanism according to claim 1, wherein a length of each of the fifth connecting rods and the sixth connecting rods is more than twice a sum of lengths of the one of the first connecting rods, the one of the second connecting rods, the one of the third connecting rods and the one of the fourth connecting rods.

* * * * *